US010356660B2

(12) United States Patent
Giraldo Rodriguez et al.

(10) Patent No.: US 10,356,660 B2
(45) Date of Patent: *Jul. 16, 2019

(54) SYSTEMS AND METHODS FOR OPTIMIZING NETWORK TRAFFIC

(71) Applicants: Carlos Giraldo Rodriguez, Vigo (ES); Jorge Ernesto Fontenla Gonzalez, Vigo (ES); Felipe Jose Gil Castineira, Vigo (ES); Francisco Javier Gonzalez Castano, Vigo (ES); Carlos Perez Garrido, Pontevedra (ES)

(72) Inventors: Carlos Giraldo Rodriguez, Vigo (ES); Jorge Ernesto Fontenla Gonzalez, Vigo (ES); Felipe Jose Gil Castineira, Vigo (ES); Francisco Javier Gonzalez Castano, Vigo (ES); Carlos Perez Garrido, Pontevedra (ES)

(*) Notice: Subject to any disclaimer, the term of this patent is extended or adjusted under 35 U.S.C. 154(b) by 0 days.

This patent is subject to a terminal disclaimer.

(21) Appl. No.: 15/628,138

(22) Filed: Jun. 20, 2017

(65) Prior Publication Data

US 2018/0152861 A1 May 31, 2018
US 2018/0368025 A9 Dec. 20, 2018

Related U.S. Application Data

(63) Continuation-in-part of application No. 14/866,550, filed on Sep. 25, 2015, now Pat. No. 9,749,243.

(51) Int. Cl.
*H04W 28/08* (2009.01)
*H04W 24/02* (2009.01)
(Continued)

(52) U.S. Cl.
CPC .......... *H04W 28/08* (2013.01); *H04W 16/22* (2013.01); *H04W 24/02* (2013.01);
(Continued)

(58) Field of Classification Search
CPC .................................................. H04W 28/08
See application file for complete search history.

(56) References Cited

U.S. PATENT DOCUMENTS 9,650,794 B2 * 5/2017 Stojanovski ............ H04W 4/70
9,853,898 B1 * 12/2017 Subramanian ........ H04L 45/745
(Continued)

*Primary Examiner* — Andrew Lai
*Assistant Examiner* — Andrew C Lee
(74) *Attorney, Agent, or Firm* — Mohr Intellectual Property Law Solutions, PC

(57) ABSTRACT

Systems and methods for optimizing network traffic are disclosed. In one embodiment, a system for optimizing the performance of a plurality of networks includes a first terminal device, a traffic steering controller, and a terminal traffic steering agent. The traffic steering controller may be configured to receive user profiles, terminal metrics and network performance metrics and create traffic steering rules based on the user profiles, terminal metrics, and network performance. The terminal traffic steering agent may be configured to receive traffic steering rules from the traffic steering controller and direct a virtual network switch based on the traffic steering rules. The virtual network switch may be configured to handle network traffic at a virtual network interface and, based on directions received from the traffic steering controller, exchange network traffic at least at a physical interface of at least one of the plurality of access networks.

20 Claims, 9 Drawing Sheets

(51) Int. Cl.
*H04W 28/02* (2009.01)
*H04W 16/22* (2009.01)
*H04W 24/10* (2009.01)
*H04W 40/20* (2009.01)

(52) U.S. Cl.
CPC ........ *H04W 28/0226* (2013.01); *H04W 24/10* (2013.01); *H04W 40/20* (2013.01)

(56) References Cited

U.S. PATENT DOCUMENTS

| | | | | |
|---|---|---|---|---|
| 2014/0162629 | A1* | 6/2014 | Tipton | H04W 24/02 455/423 |
| 2014/0344439 | A1* | 11/2014 | Kempf | G06F 9/5072 709/224 |
| 2015/0124815 | A1* | 5/2015 | Beliveau | H04L 45/38 370/392 |
| 2015/0215835 | A1* | 7/2015 | Sirotkin | H04W 36/16 455/436 |
| 2015/0263901 | A1* | 9/2015 | Kumar | H04L 41/12 370/254 |
| 2016/0164787 | A1* | 6/2016 | Roach | H04L 47/125 370/235 |

\* cited by examiner

SYSTEMS AND METHODS FOR OPTIMIZING NETWORK TRAFFIC

CROSS REFERENCE TO RELATED APPLICATIONS

This application claims priority to and is a continuation-in-part of U.S. Pat. No. 9,749,243, filed on Sep. 25, 2015 which is hereby incorporated by reference for all purposes.

BACKGROUND

The fourth generation of cellular telephony (LTE), based on OFDMA, is being deployed worldwide. LTE has significant improvements for end users like lower latency and higher average and peak downlink and uplink rates. Nevertheless, the adoption of mobile telephony is growing so fast that the operators' access and backhaul networks will soon become bottlenecks, and it is also expected that this problem will worsen with the emergence of ultra-dense cellular networks based on 5G. To alleviate this problem, operators are relying on as a complementary access technology to offload some traffic from their cellular networks. Thus, in densely populated areas there is currently a variety of access networks available and this trend is likely to continue in the future.

Some access networks (cellular, Wifi) may be better for certain kinds of traffic. To that end the 3GPP, the consortium behind LTE, has defined the Access Network Discovery and Selection Function (ANDSF). ANDSF assists LTE terminals in the discovery of non-3GPP access networks (e.g. WiFi and WiMAX). It consists of information on alternative access networks that is stored on a server and fetched by the terminal to assist it in its connection process. However, ANDSF rules are static in the sense that they will be applied for an entire traffic session regardless of the network dynamics, like the number of terminals connected to a specific access point.

Thus there is a need for proactive congestion control consisting of two complementary steps: on the one hand, it should provide the means to predict the future state of the network in order to anticipate potential problems; on the other hand, and depending on the prediction, it should allow to change the network configuration in a convenient way.

In the present invention we disclose systems and methods to integrate wireless user terminals with multihoming capabilities into Software Defined Network (SDN) architectures. This will allow SDN network controllers to issue access network selection commands to user terminals relying on predictions based on terminal-side info nation thus supporting global network optimization. In the present invention, unlike in previous work, wireless terminal interface configuration is an integral part of the architecture.

SUMMARY

The present disclosure is directed to systems and methods for optimizing network traffic. In one embodiment, a system for optimizing the performance of a plurality of networks includes a first terminal device, a traffic steering controller, and a terminal traffic steering agent. The first terminal device may be in electronic communication with the plurality of networks. The traffic steering controller may be in electronic communication with the first terminal device. The traffic steering controller may also be configured to receive user profiles and network performance metrics and create traffic steering rules based on the user profiles and network metrics. The terminal traffic steering agent nay be configured to receive traffic steering rules from the traffic steering controller and direct a virtual network switch based on the traffic steering rules. The terminal traffic steering agent may include a user profiling manager, a network metrics manager, and an access discovery and selection manager. The user profiling manager may be configured to generate and update the user profiles and send them to the traffic steering controller. The network metrics manager may be configured to collect the network performance metrics and send them to the traffic steering controller. The access discovery and selection manager may be configured to discover and identify the plurality of networks and, based thereon, report available network information to the traffic steering controller. The virtual network switch may be configured to receive network traffic at a virtual network interface and, based on directions received from the traffic steering controller, forward the network traffic to a physical interface of at least one of the plurality of networks.

DETAILED DESCRIPTION

The disclosed network traffic management systems and methods will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, a variety of network traffic management systems and methods examples are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
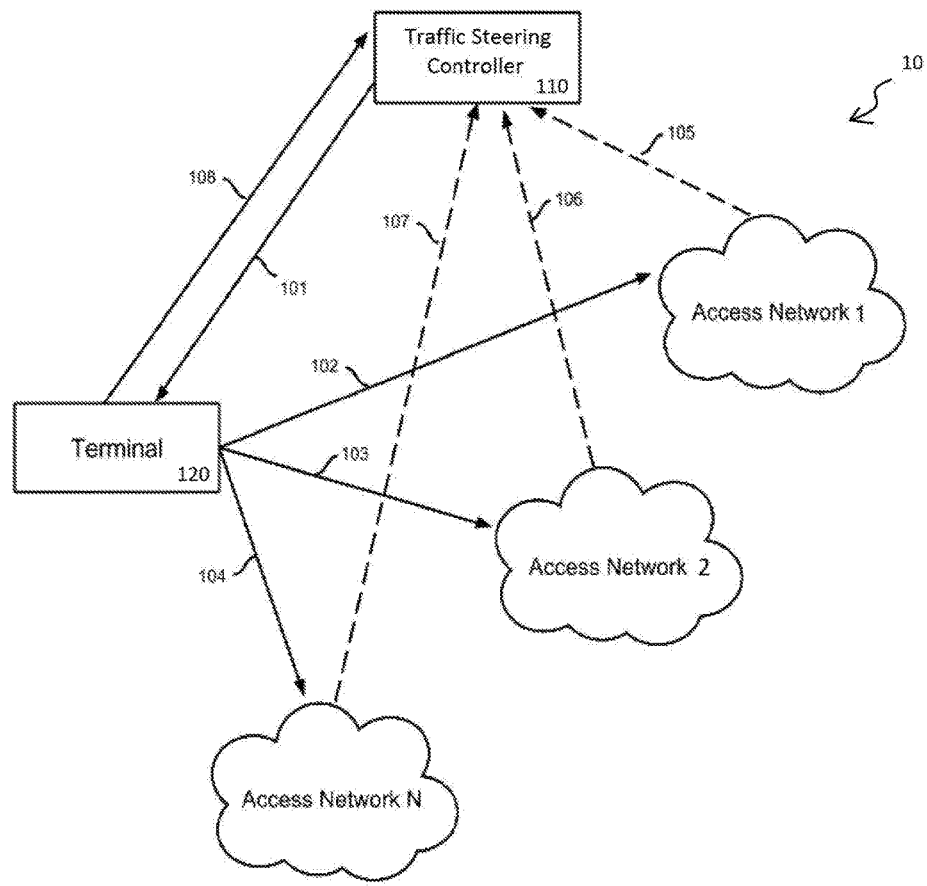
FIG. 1 is a schematic illustration of a first embodiment of a network traffic steering system.

A first example of a network traffic steering system 10 is shown in FIG. 1. Network traffic steering system 10 includes a traffic steering controller 110, a plurality of access networks 1 through N, and at least one terminal device 120. In some embodiments, the access networks 1 through N may each be the same type of connection (e.g., WiFi). In other embodiments, the access networks 1 through N may include different types of networks utilizing different communication technologies (e.g. at least one WiFi network and at least one LTE network, among others). Terminal device 120 may be connected to one or more of networks 1 through N via connections 102 through 104. In this regard, terminal device 120 includes at least one network interface. In some embodiments, terminal device 120 includes a network interface for each different type of networks 1 through N.

Traffic steering controller 110 may communicate electronically with terminal device 120 via connection 101. For example, in some embodiments, traffic steering controller 110 may send OpenFlow commands to terminal device 120 via connection 101. The OpenFlow commands may instruct the terminal device 120 how to distribute the network traffic being sent by terminal device 120 through the plurality of access networks 1 through N. In one example, the traffic steering controller 110 may instruct the terminal device 120 to send voice traffic through access network 1, wherein access network 1 may provide less delay. In another example, the traffic steering controller 110 may instruct the terminal device 120 to send elastic traffic through access network 2.

In some embodiments, connection 101 between terminal device 120 and traffic, steering controller 110 may be established via one or more of networks 1 through N. In this regard, terminal device 120 and traffic steering controller 110 may remain connected (via connection 101) throughout an entire session, despite terminal device 120 connecting and disconnecting from various one of networks 1 through N, so long as terminal device 120 is always connected to at least one network.

Traffic steering controller 110 may communicate electronically with one or more of networks 1 through N via, connections 105 to 107. Specifically, traffic steering controller 110 may collect network metrics from the plurality of network devices (routers, switches, access points) of networks 1 though N via connections 105 to 107. The collected network metrics may include, but are not limited to, link occupancy, queue size, CPU load, and the throughput and number of connections of each type of traffic. It may be appreciated that traffic steering controller 110 may collect any other kind of relevant network metric in addition to those listed above.

Networks 1 though N may include access and backhaul networks. Networks 1 though N include a plurality of network devices (routers, switches, access points).

Terminal device 120 may communicate electronically with traffic steering controller 110 via connection 108. In some embodiments, terminal device 120 may send terminal device metrics regarding the access networks within range of terminal device 120. Examples of terminal device metrics include, but are not limited to, Service Set Identifier (SSID) of the networks within range, access technology implementation details of the networks, information about the quality of the connection, the radio access technologies available at the terminal device, the physical location of the terminal device, battery level of the terminal device, and/or the operating system of the terminal device.

In some embodiments, connection 108 enables terminal device 120 to send one or more user profiles to the traffic steering controller 110. As used herein, a "user profile" is a compilation of machine-readable information elated to the behavior of the user of a terminal device which can influence the quality of his/her experience or the performance of the network(s) connected to the terminal device. The user profile may be used to predict the future impact on the user's experience of the networks connected to the terminal device, based on the recent behavior of the user.

The traffic steering controller 110 may be configured to control traffic through each of networks 1 through N, based at least in part on the terminal metrics, network metrics, and/or together with the profile of the user.

Figure 2:
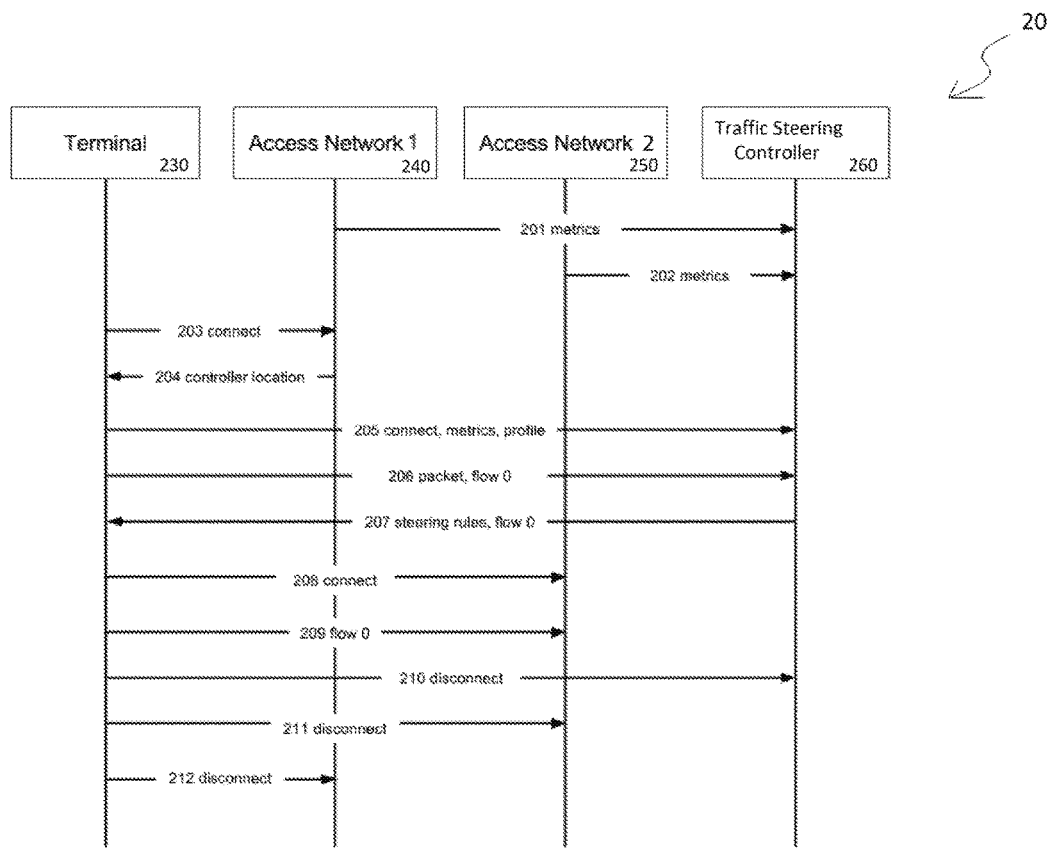
FIG. 2 is a sequence diagram of a first example of a method of steering network traffic.

Turning now to FIG. 2, a second example of a traffic steering system 20 will now be described. Traffic steering system 20 includes many similar or identical features to traffic steering system 10. Thus, for the sake of brevity, each feature of traffic steering system 10 will not be redundantly explained.

As can be seen in FIG. 2, traffic steering system 20 includes a terminal device 230, a first access network 240, a second access network 250, and a traffic steering controller 260. In the illustrated embodiment of FIG. 2, terminal device 230 may discover and connect to traffic steeling controller 260 managing two federated access networks 240, 250. Terminal device 230 may send a data flow and close the connection with the traffic steering controller 260 and the networks.

Periodically, both the first and the second access net corks, 240, 250 may send network metrics 201, 202 to traffic steering controller 260. Network metrics 201, 202 may include metrics related to one or more network devices of access networks 240, 250. For example network metrics 201, 202 may include metrics related to routers, switches and/or access points of access networks 240, 250. Network metrics 201, 202 may be sent periodically as the conditions of the networks change over time.

Terminal device 230 may send a connection request 203 to first access network 240. First access network 240 replies with a message 204 containing an identifier of the traffic steering controller 260 via, for example, DHCPv4 option 43 or DHCPv6 option 17. After the identifier of traffic steering controller 260 has been received, terminal device 230 establishes a connection with traffic steering controller 260. Terminal device 230 sends terminal information 205 to the traffic steering controller 260. Terminal information 205 includes terminal metrics of terminal device 230 and a user profile of a user of terminal device 230.

Traffic steering controller 260 collects information from the user profile and the terminal metrics, including the access network alternatives within the reach of the terminal (in this case, access network 240 and access network 250) as well as additional useful information. Terminal 230 sends terminal information 205 periodically as the conditions and visibility of the available access networks change over time.

At this point, terminal 230 is ready to start generating traffic. Terminal 230 may send a data flow 206. Traffic steering controller 260, based at least in part of the user profile, network metrics and/or terminal metrics may create traffic steering rules 207 in order to optimize the performance of access networks 240, 250.

Traffic steering controller 260 may then send traffic steering rules 207 to terminal device 230. Traffic steering rules 207 may include an instruction to route data flow 206 through second access network 250. Specifically, traffic steering rules 207 may include instructions to terminal device 230 to connect to second access network 250, and the required credentials to make the connection process transparent to the user. Therefore, the terminal establishes connection 208 to second access network 250 and, once the connection is established, sends data flow 209 to second access network 250. The above described process may be repeated with addition a data flows.

At any point in the session, traffic steering controller 260 may request terminal 230 to resend an expanded or updated version of the user profile. In some embodiments, the updated user profile may include additional or more recent information.

Once the terminal device 230 has finished sending and receiving data, the connection with traffic steering controller 260 may be closed. To that end, terminal device 230 may send disconnect notification 210 to traffic steering controller 260. Additionally or alternatively, terminal device 230 may send disconnect instructions 212, 211 to respective access networks 240, 250.

Figure 3:
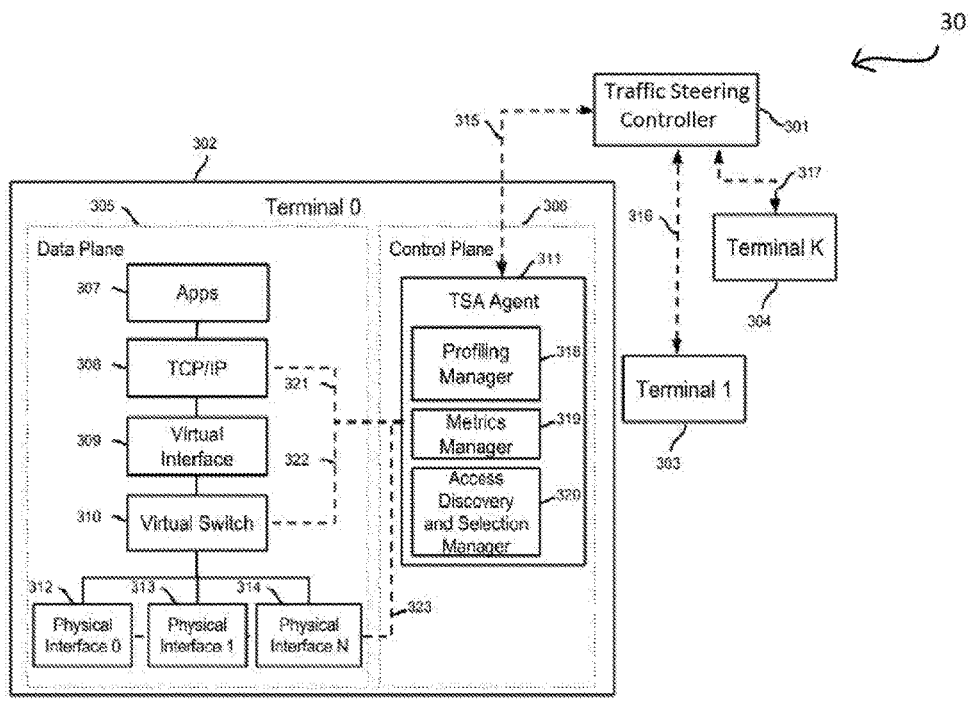
FIG. 3 is a schematic illustration of a second embodiment of a network traffic steering system.

Turning now to FIG. 3, a third example of a traffic steering system 30 will now be described. Traffic steering system 30 includes many similar or identical features to traffic steering system 10 and/or traffic steering system 20. Thus, for the sake of brevity, each feature of traffic steering systems 10 and 20 will not be redundantly explained.

As can be seen in FIG. 3, traffic steering system 30 includes a traffic steering controller 301 connected to a plurality of terminal devices 302-304. Exemplary first terminal 302 includes a protocol stack comprising data plane 305 and control plane 306. Data plane 305 includes layers 307-310. Specifically, data plane includes an uppermost application layer 307 above a network layer 308, a virtual interface 309 below the network layer 308, a virtual switch 310 below the virtual interface 309, and physical interfaces 1 through N below the virtual switch 310. Each layer of layers 307-310 serves the layer above it and is served by the layer below it. As can be seen, virtual interface 309, rather than a physical network interface, is directly below the network layer 308. Unlike a network interface, virtual interface 309 is configured to use the same L2 network primitives as network layer 308.

Virtual interface 309 routes network traffic to virtual switch 310. The virtual switch 310 forwards the network traffic from the virtual interface 309 through one or more physical interfaces 312-314.

Virtual switch 310 is governed control plane 306 of terminal 302. Specifically, Terminal traffic steering agent 311 programs virtual switch 310 with one or more traffic steering rules 322 to route the network traffic through the plurality of physical interfaces 312-314. Ultimately, these traffic steering rules are supplied from the traffic steering controller 301 to the Terminal traffic steering agent 311. The traffic steering controller 301 creates the traffic steering rules based at least in part on: 1) information from the network, such as network metrics and/or user profiles and 2) policies provided by a human administrator of the traffic steering controller 301. Once created, the traffic steering rules are sent from the traffic steering controller 301 to terminals 302-304 via connections 315-317.

In one embodiment, the administrator may create traffic steering rules, via traffic steering controller 301, with the goal of balancing network load. Thus, the created traffic steering rules would spread the traffic of the terminals across available access points.

In another embodiment, the administrator may create traffic steering rules, via traffic steering controller 301, to discriminate delay-sensitive traffic from any other traffic. The created traffic steering rules would forward delay-sensitive traffic to the least loaded access points, and non-delay-sensitive traffic to the rest of access point.

In some embodiments, the traffic steering rules comprise a matching structure and an associated action. The matching structure is merely a template to compare the packets against. In one example of a traffic steering rule, a matching structure is a template to identify Transmission Control Protocol (TCP) packets. In the example, the action associated with the TCP packet matching structure is to forward the packet through physical interface 313. Thus, if a TCP packet identified via the matching structure, the TCP packet will be directed by virtual switch 310 through physical interface 313.

In other embodiments, the action associated with a traffic steering rule may be dropping the packet, changing some of the header fields of the packet, performing tunneling, and/or a combination thereof.

Terminal traffic steering agent 311 is responsible for the control plane of the terminal 306. Specifically, terminal traffic steering agent 311 is configured to receive traffic steering rules from traffic steering controller 301 and, based thereon, program the virtual switch 310 via connection 322.

Terminal traffic steering agent 311 comprises a profiling manager 318, a metrics manager 319 and an access discovery and selection manager 320. The profiling manager 318 is responsible for collecting and updating user profiles including the user's behavior and activity, and for sending them to traffic steering controller 301 at the beginning of a session or when requested by traffic steering controller 301.

Metrics manager 319 collects network metrics concerning ongoing connections and sends them to traffic steering controller 301. Such network metrics may include information from Layers 2 to 5 and even from the operating system itself.

Finally, the access discovery and selection manager 320 assists in the selection and connection to access networks. This component sends information to the traffic steering controller 301 concerning the physical network interfaces available at terminal device 302, and the access networks in the surroundings of terminal device 302, along with the corresponding information about the quality of the link. The latter changes and therefore is updated periodically, as new access networks become available (for instance if the user is moving). The access discovery and selection manager 320 also receives configuration parameters from the traffic steering controller 301 and sends the configuration parameters to be applied to network layer 308 via communication 321 and its physical interfaces 312-314 via communication 323. Configuration parameters may include credentials or IP addresses.

Terminal traffic steering agent 311 may install forwarding rules in virtual switch 310 via communication 322. The forwarding rules may allow virtual switch 310 to filter, block, transform or leave unaltered the traffic exchanged via physical interfaces 312-314. Terminal traffic steering agent 311 may configure physical interfaces 312-314, via communication 323, with the appropriate access signaling and security parameters to allow connection to a plurality of access networks, as decided by traffic steering controller 301.

Figure 4:
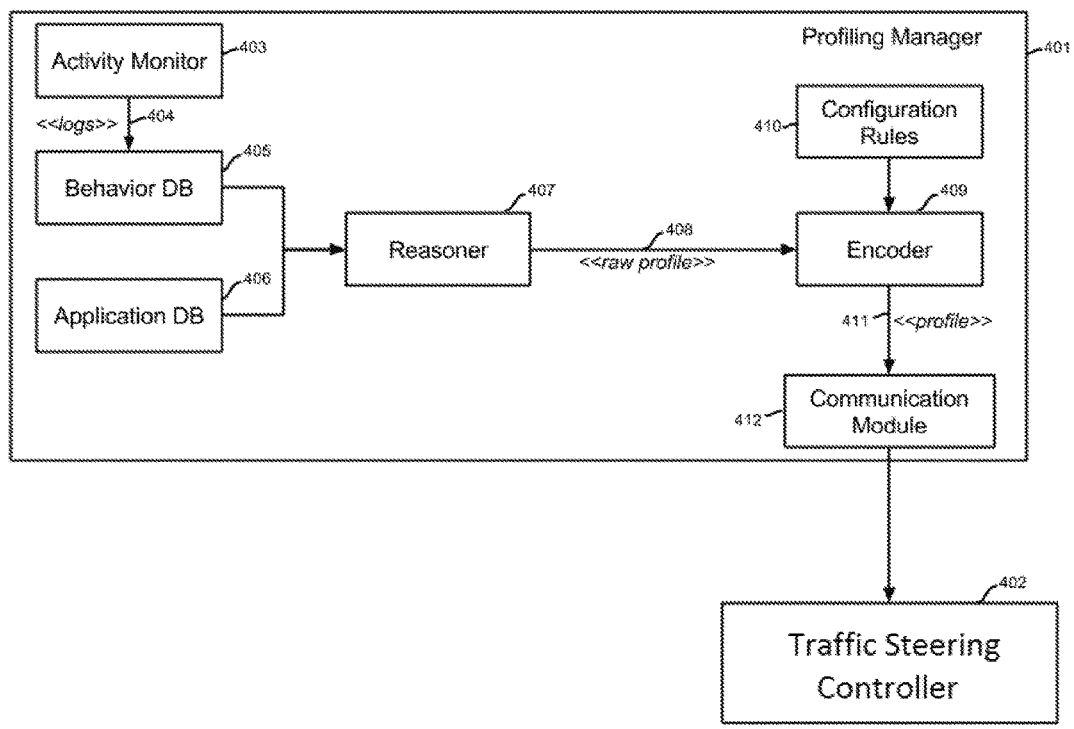
FIG. 4 is a schematic illustration of a profiling manager of a terminal device.

Turning now to FIG. 4, one embodiment of a profiling manager is shown. Exemplary profiling manager 4 includes an activity monitor 403, a behavior database 405, an application database 406, a reasoner 407, configuration rules 410, an encoder 409 and a communication module 412.

Profiling manager 401 is configured to create user profiles. The user profiles are sent from profiling manager 401 to traffic steering controller 402. The user profiles may be useful for the network-planning tasks of the traffic steering controller 402.

The activity monitor 403 monitors the actions of the user and the consequences thereof on the network. The activity translates the action of the user into information 404 that is stored in the behavior database 405.

The application database 406, stores an updated collection of patterns, heuristics and port numbers that can be used to identify applications. The information gathered in the application database 406 may supplement the information gathered the behavior database 405. Specifically, the application database 406 gathers information regarding running applications. Such information may be useful, for example, in the event the behavior database 405 gathers incomplete information due to hardware or software restrictions.

The reasoner 407 extracts the key features of the behavior of the user, based at least in part on the information 404 stored in the behavior database 405, and the application database 406. These key features comprise any kind of information that may provide the traffic steering controller with useful insight about the behavior of the user related to network access and use. Key features may be collected, at least in part, by the operating system of the terminal device or any of its sensors.

Key features may include the time evolution of the uplink and downlink throughput for each application, the operating system version, information from the terminal accelerometer and magnetometer, information from its geopositioning module, identifiers of the access networks the terminal connects to and of those within its reach, and/or information from the agenda of the user with his appointments and their location, among others.

All the key features are translated into a raw profile 408. Raw profile 408 may contain redundant information that may be suppressed in order to minimize the costs of its transmission to the traffic steering controller 402.

Encoder 409 takes the raw profile 408 and transforms it into a lightweight profile 411. The operation of encoder 409 is controlled by configuration rules 410. Configuration rules 410 instruct encoder 409 which data processing techniques to apply to raw profile 408. These data processing techniques include, but are not limited to, sampling, compression, statistical characterization (such as statistical regression) and/or user classification. Data processing techniques can also specify which aspects of raw profile 408 should be removed and which ones should be kept. Finally, the finished user profile is delivered to communication module 412, which in turn forwards it to traffic steering controller 402.

In one embodiment, activity monitor 403 obtains key features by collecting the throughput of the applications used by the user and his location during 24 hours, and stores them 404 in the behavior database 405. When the user connects to a traffic steering enabled network reasoner 407 accesses the information from the last week from the behavior database 405 and combines it with the information from the application database 406 to get raw profile 408. In this embodiment, the configuration rules 410 state that encoder 409 must calculate for each application the 90th percentile of the downlink throughput, the time that value was exceeded, and the location of the user at that moment. These results are collected in profile 411 that is delivered to the communication module 412, which in turn forwards the profile to the traffic steering controller 402.

In another embodiment, the configuration rules 410 state that geopositioning information should not be part of the profile 411 due to the terminal privacy settings of the user, and only the 90th percentile of the downlink throughput of each application and the corresponding times of the day are kept.

Figure 5:
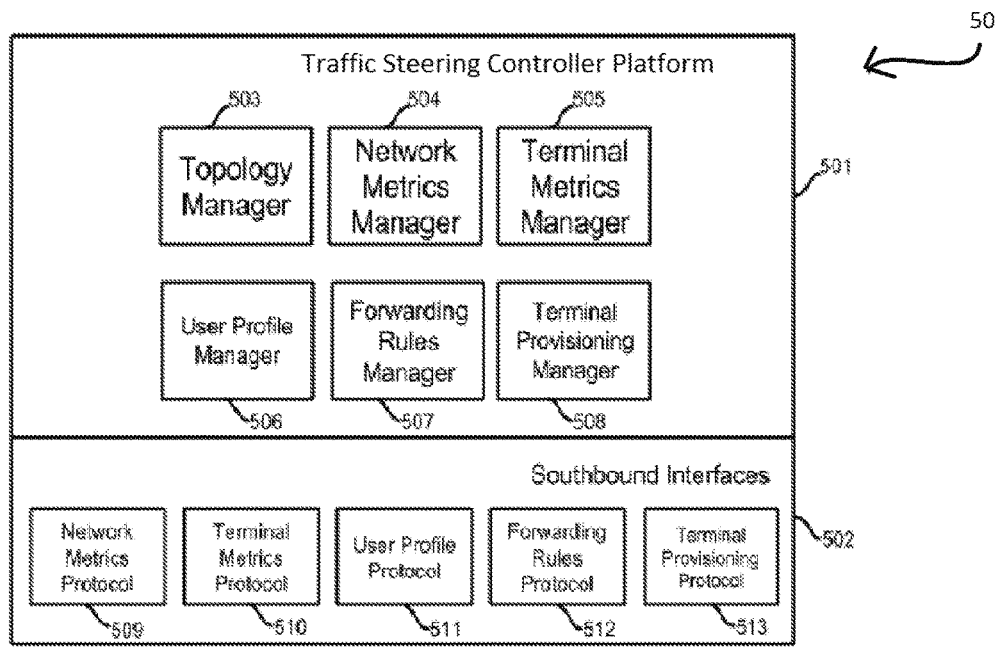
FIG. 5 is a schematic illustration of one embodiment of a traffic steering controller.

Turning now to FIG. 5, one embodiment of a traffic steering controller 50 is shown. Traffic steering controller 50 includes traffic steering controller platform 501 and southbound interface 502. Southbound interface comprises five communication protocols, specifically, a network metrics protocol 509, a terminal metrics protocol 510, a user profile protocol 511, forwarding rules protocol 512, and a terminal provisioning protocol 513.

Network metrics protocol 509 a allows traffic steering controller 50 to get metrics from the network devices (switches, access points, routers) that build up both the federated access networks and the backhaul networks. A broad variety of existing protocols can be used, such as Simple Network Management Protocol (SNMP).

Terminal metrics protocol 510 allows traffic steering controller 50 to fetch metrics related to the activity of the terminal device. The mobile nature of wireless terminal devices and the high variability of the propagation conditions may require a southbound protocol with different requirements than those of network metrics protocol 509.

User profile protocol 511 is the protocol used by the terminal device to send the user profile from profiling manager 401 to traffic steering controller platform 501 at the beginning of the session. User profile protocol 511 is also configured to relay a traffic steering controller's request for a profile update at any moment of the session, and to transport the response of the terminal device back to the traffic steering controller.

The forwarding rules protocol 512 is responsible for carrying the traffic steering rules from the traffic steering controller to the terminal device(s) and to the network devices whose forwarding plane should be modified according to the decision of the traffic steering controller platform 501.

Terminal provisioning protocol 513 carries L1, L2 and L3 information (e.g. WiFi passwords) from the traffic steering controller 50 to the terminal device(s) in order to assist in the configuration of the network interfaces of the latter.

The traffic steering controller platform 501 comprises a plurality of modules that provide the necessary functionality to create traffic steering rules for all the connected terminal devices. Specifically, the traffic steering controller platform 501 includes a topology manager 503, a network metrics manager 504, a terminal metrics manager 505, a user profile manager 506, a forwarding rules manager 507, and a terminal provisioning manager 508.

Network metrics manager 504 stores, monitors and processes the network metrics from the plurality of network devices from the access and backhaul networks.

Terminal metrics manager 505 stores, monitors and processes the terminal metrics of the terminal devices connected to some of the federated networks.

Topology manager 503 keeps an updated network map including the topology, characteristics and performance of the network. Whenever a reconfiguration or modification in the network takes place, the changes must be reflected in the network map stored by this module. Topology manager 503 is also responsible for calculating the optimal path between two points of the network. Therefore, whenever traffic steering controller platform 501 creates traffic steering decisions for a particular terminal, the traffic steering controller uses the global view of the network of the topology manager 503.

User profile manager 506 stores and processes the user profiles. When the virtual switch of a terminal device cannot match a packet according to the current set of traffic steering rules, the virtual switch sends the packet to the traffic steering controller platform 501. In response to receiving the packet, the forwarding rules manager 507 may create a rule for forwarding the packet. To that end, the forwarding rules manager 507 uses the information managed by the topology manager 503, the network metrics manager 504, the terminal metrics manager 505 and the user profile manager 506 in order to create a set of traffic steering rules dictating to the terminal device how it should forward the flow.

In some embodiments, the set of traffic steering rules may be created to maximize a figure of merit, for example, a set of traffic steering rules may be created to maximize the average throughout of the flow.

If the decision of the forwarding rules manager 507 dictates that the terminal must send the flow through another network interface, the terminal provisioning manager 508 supplies the required parameters that the terminal device needs in order to configure the new network interface (e.g., authentication credentials). The application of a set of steering rules in one terminal may require the modification of the forwarding plane of other terminals and network devices according to global criteria. In this case, the forwarding rules manager 507 may also create a set of rules to be applied to other terminals and devices.

The procedure followed by the forwarding rules manager 507 to combine the information from the topology manager 503, the network metrics manager 504, the terminal metrics manager 505 and the user profile manager 506 is defined by the network administrator depending on a plurality of criteria such as the characteristics of the network, the expected traffic characteristics and network load, the associated costs and revenues, and any other contextual information.

Figure 6:
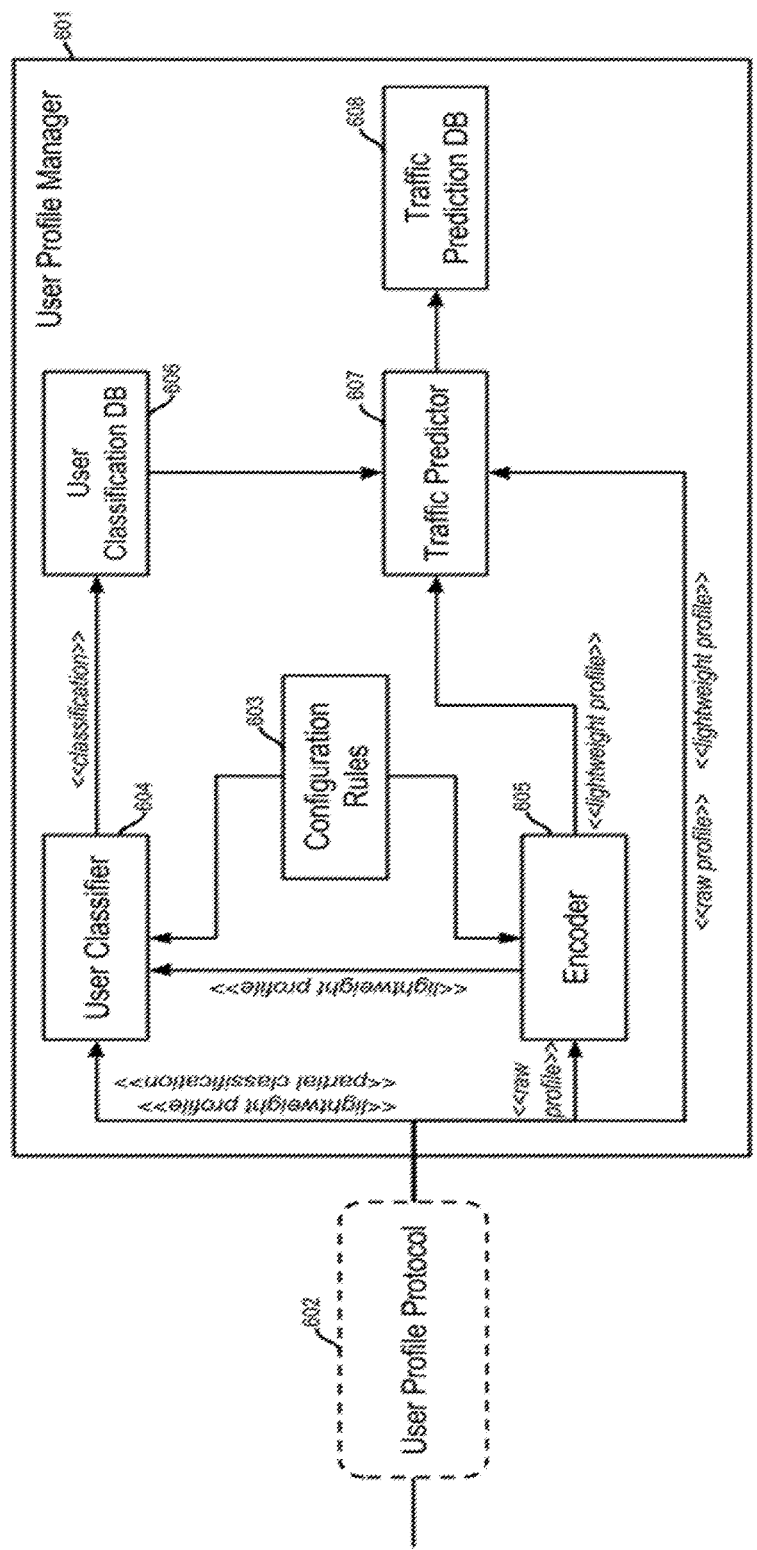
FIG. 6 is a schematic illustration of a user profile manager.

Turning now to FIG. 6, one embodiment of a user profile manager 601 is shown. User profile manager 601 includes a user classifier 604, a user classifier database 606, configuration rules 603, an encoder 605, a traffic predictor 607 and a traffic prediction database 608.

The user profile protocol 602 may forward the different profiling information created by the user to different modules depending on the kind and content of the user profiling information. The encoder 605 transforms a raw profile into a lightweight profile by applying different data processing and statistical techniques.

The particular details of the calculations carried out by the encoder 605 are given by the configuration rules 603. The configuration rules 603 also govern the behavior of the encoder 605 when the lightweight profile has been created. The result can be either sent to the traffic predictor 607 or to the user classifier 604.

The user classifier 604 classifies the user to a specific category of users, where the categories are given by the configuration rules 603. The classification may be applied to a lightweight profile sent by the user profile protocol 602 or the encoder 605, or to a partial classification carried out by the user terminal device.

In one example, the user terminal device performs a coarse user classification that is sent to the user classifier 604 for further refinement.

In another example the user terminal performs no user classification and delegates the task to the user classifier 604, which performs the aforementioned classification based on the lightweight profile sent by the user. The result of the user classifier 604 is stored in the user classification database 606.

Traffic predictor 607 is configured to predict the traffic generated by the user. Traffic predictor 607 operates using as input a classification previously made by the user classifier 604 and stored in the user classification database 606, or directly a raw or a lightweight profile. Traffic predictor 607 may be provided with a raw profile when an accurate traffic prediction is required, and therefore no information on the behavior of the user must be discarded a priori. If such accuracy is not necessary, traffic predictor 607 may operate on profile or the data retrieved from the user classification database 606. In these cases, the result of the operation of the traffic predictor 607 may be stored in the traffic prediction database 608.

Figure 7:
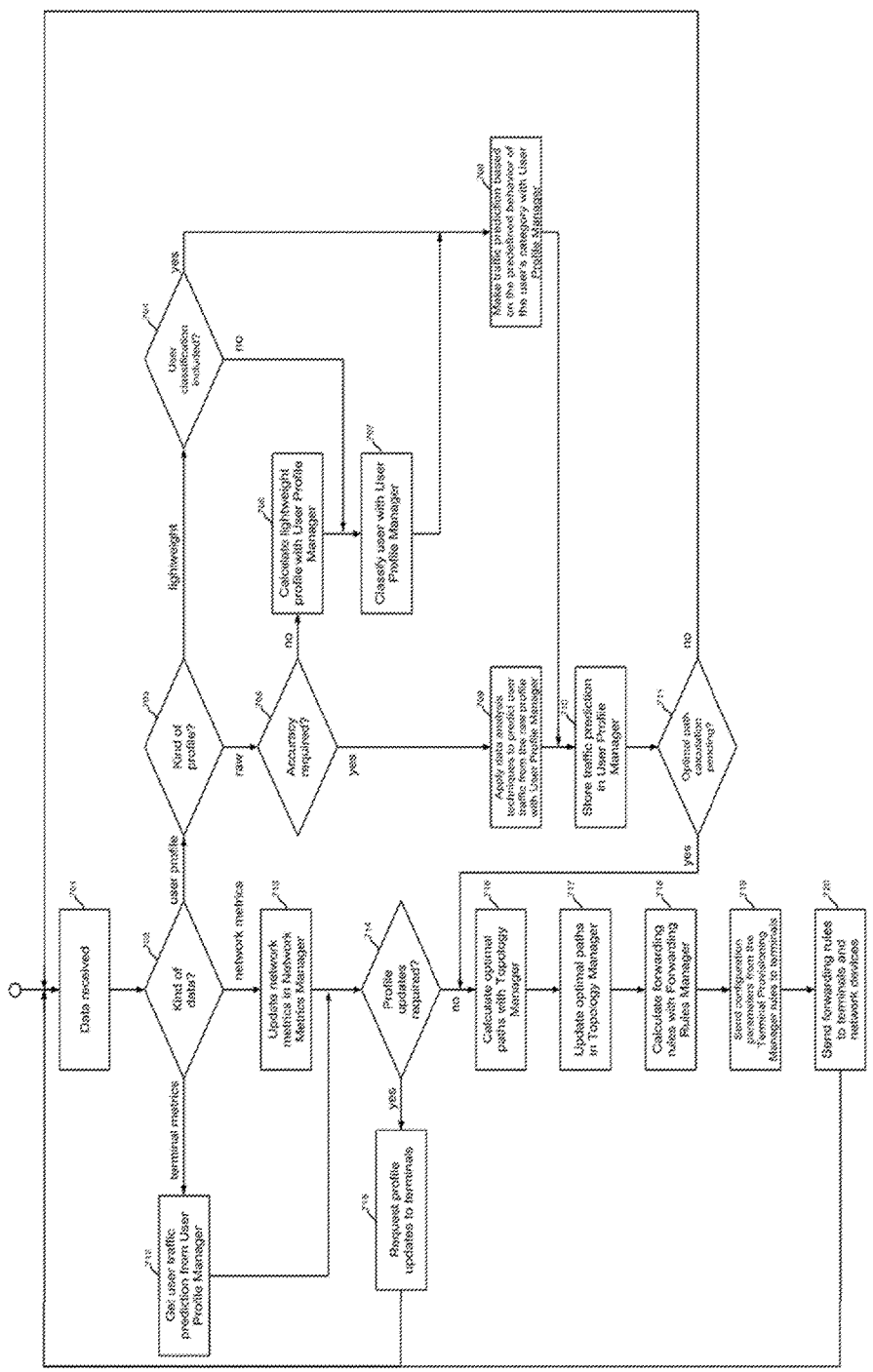
FIG. 7 is a schematic illustration of a method of controlling the dataflow from one or more terminal devices over a plurality of networks.

Turning now to FIG. 7, one embodiment of a method of controlling the dataflow from one or more terminal devices over a plurality of networks is illustrated. The method includes receiving data 701 at the traffic steering controller. The data may relate to the state of a network and its connected terminal devices. The data is evaluated 702 by the traffic steering controller.

If the received data contains a user profile, the type of profile is determined 703. If the profile is a lightweight profile, the traffic steering controller checks 704 if the classification has already been performed by the terminal itself and included in the lightweight profile. If not, the traffic steering controller will classify 707 the user via the user profile manager. If the user classification is already included in the profile, the user profile manager predicts 708 the traffic to be generated by the user. The prediction is subsequently 710 stored for future use.

If the user profile is determined 703 to be a raw profile, time traffic steering controller determines 705 the traffic prediction accuracy required. If the accuracy level desired does not require working on raw profiles, the user profile manager may calculate 706 a lightweight profile from the raw profile, which in turn the user profile manager may use to classify 707 the user as described above.

If accuracy is a stringent requirement, the user profile manager may analyze 709 the raw profile to predict future traffic from the user's actual behavior, rather than from the predefined behavior of the category the user is allocated to. In any case the traffic prediction, based either on the lightweight profile or on the raw profile, is based on an appropriate combination of data processing and statistical tools, which may involve terminal-side processing, traffic steering controller-side processing, or both. Once the prediction is calculated, it may be stored 710 as described above.

The traffic steering controller may then determine 711 whether the profiles were received due to an explicit request to have undated profile information. If not, the traffic steering controller waits to receive 701 new data. If the profiles were received due to an explicit request have updated profile information, the traffic steering controller may calculate 716 the optimal path via the topology manager.

If the data received in step 701 is determined in step 702 to contain terminal metrics from a terminal device, the traffic steering controller may retrieve 712 the user traffic prediction from the user profile manager, where it had been previously stored 710. If the received data is determined in step 702 to contain network metrics, the network metrics in be stored 713 via the network metrics manager in order to keep an updated estimate of the performance of the network.

If the received data contains terminal metrics or network metrics, the traffic steering controller may consider 714 whether an update of the profiles of a plurality of users is also required, in view of the new metrics. If this is the case, the traffic steering controller will request 715 profile updates from the terminal devices, and wait to receive 701 new data.

Next, the traffic steering controller recalculates 716 optimal paths to and from the terminals with the topology manager. Indeed the new metrics may imply that a previously optimal path is no longer optimal, for example because the former optimal path passes through a network node that is experiencing congestion. Therefore, the optimal paths may be recalculated 716, and the result updated 717 in the topology manager.

With the new optimal paths the traffic steering controller may calculate 718, via the forwarding rules manager, a set of forwarding rules for a plurality of terminals and a plurality of network devices. If the rules involve using new physical network interfaces at the terminal they may be configured accordingly. In that case, the terminal provisioning manager sends 719 interface configuration information to the plurality of terminals.

Once the interfaces are properly configured, the forwarding rules are sent 720 to the plurality of terminals and the plurality of network devices. Then the traffic steering controller waits to receive 701 new data.

As described above, in some embodiments, the network traffic management methods of the present application may be employed to control or interact with one or more computing devices, e.g., terminal devices. In this regard, it will be appreciated that various disclosed examples may be implemented using electronic circuitry configured to perform one or more functions. For example, with some embodiments of the invention, the disclosed examples may be implemented using one or more application-specific integrated circuits (ASICs). More typically, however, components of various examples of the invention will be implemented using a programmable computing device executing firmware or software instructions, or by some combination of purpose-specific electronic circuitry and firmware or software instructions executing on a programmable computing device.

Figure 8:
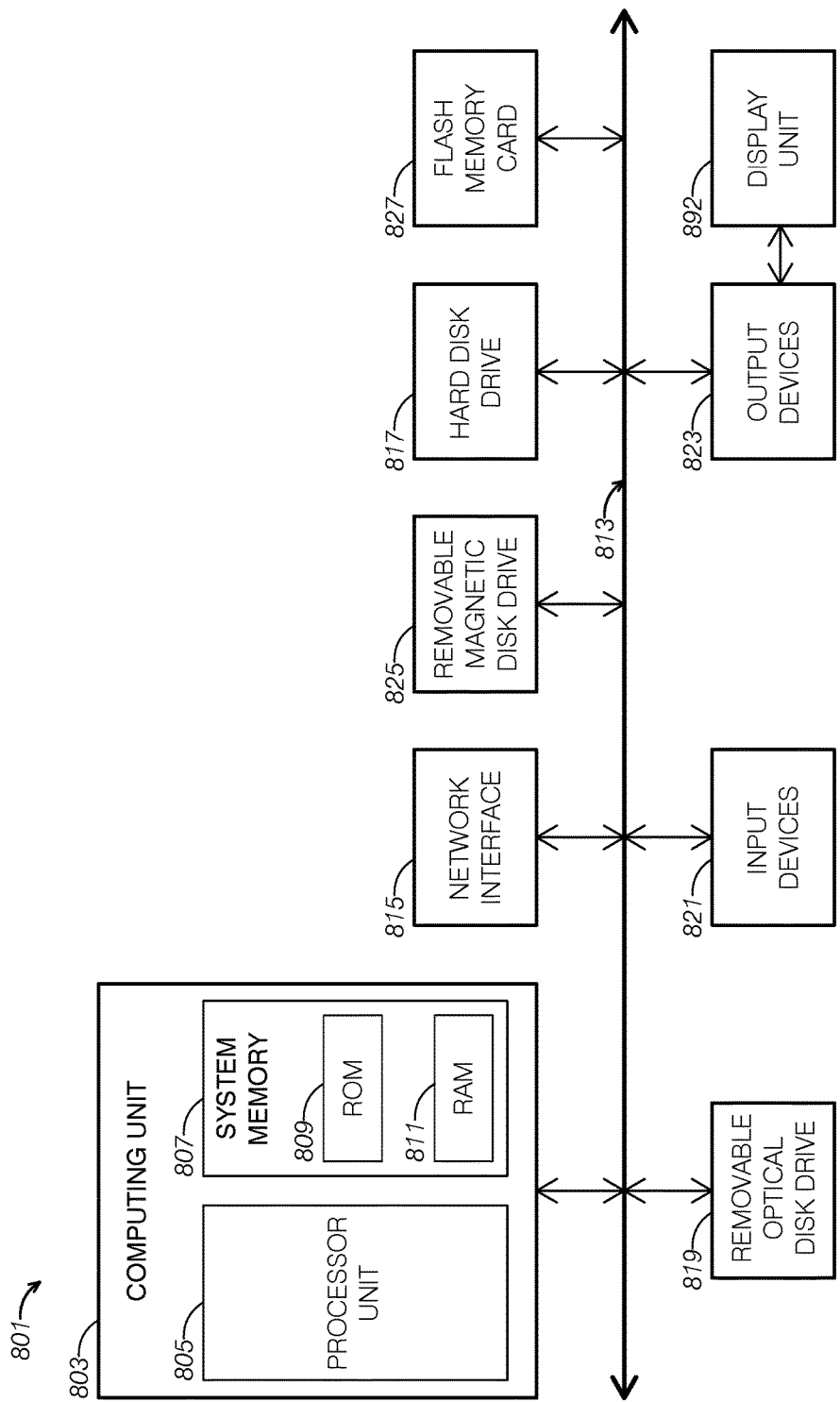
FIG. 8 is a schematic illustration of one example of a terminal device.

Accordingly, FIG. 8 shows one illustrative example of a computing device, terminal device 801, which can be used to implement various embodiments of the invention. Terminal device 801 may be incorporated within a variety of consumer electronic devices, such as personal media players, cellular phones, smart phones, personal data assistants, global positioning system devices, smart eyewear, smart watches, other computer wearables, and the like.

As seen in this figure, terminal device 801 has a computing unit 803. Computing unit 803 typically includes a processing unit 805 and a system memory 807. Processing unit 805 may be any type of processing device for executing software instructions, but will conventionally be a microprocessor device. System memory 807 may include both a read-only memory (ROM) 809 and a random access memory (RAM) 811. As will be appreciated by those of ordinary skill in the art, both read-only memory (ROM) 809 and random access memory (RAM) 811 may store software instructions to be executed by processing unit 805.

Processing unit 805 and system memory 807 are connected, either directly or indirectly, through a bus 113 or alternate communication structure to one or more peripheral devices. For example, processing unit 805 or system memory 807 may be directly or indirectly connected to additional memory storage, such as a hard disk drive 817, a removable optical disk drive 819, a removable ma disk drive 825, and a flash memory card 827. Processing unit 805 and system memory 807 also may be directly or indirectly connected to one or more input devices 821 and one or more output devices 823.

Output devices 823 may include, for example, a monitor display, an integrated display 892, television, printer, stereo, or speakers. Input devices 821 may include, for example, a keyboard, touch screen, a remote control pad, a pointing device (such as a mouse, touchpad, stylus, trackball, or joystick), a scanner, a microphone, or a camera.

More specifically in the presently described gesture recognition systems, input devices 821 include at least a camera 822 (e.g., a light camera, a thermographic camera, etc.). In one example, camera 822 is a visible light digital camera. The visible light digital camera uses an optical system including a lens and a variable diaphragm to focus light onto an electronic image pickup device. The visible light digital camera can be a compact digital camera, a bridge camera, a mirrorless interchangeable-lens camera, a modular camera, a digital single-lens reflex camera, digital single-lens translucent camera, line-scan camera, etc. Further, it will be appreciated that the visible light digital camera can be any known or yet to be discovered visible light digital camera.

In one embodiment, camera 822 is integral to the terminal device 801. In another embodiment, camera 822 is remote of the terminal device 801.

As mentioned above, camera 822 can additionally or alternatively be a thermographic camera or infrared (IR) camera. The IR camera can detect heat radiation in a way similar to the way an ordinary camera detects visible light. This makes IR cameras useful for gesture recognition in "normal light", "low light", and/or "no light" conditions. The IR camera can include cooled infrared photodetectors (e.g., indium antimonide, indium arsenide, mercury cadmium telluride, lead sulfide, lead selenide, etc.) and/or cooled infrared photodetectors (e.g., vanadium oxide, lanthanum barium manganite, amorphous silicon, lead zirconate titanate, lanthanum doped lead zirconate titanate, lead scandium tantalate, lean lanthanum titanate, lead titanate, lead zinc niobate, lead strontium titanate, barium strontium titanate, antimony sulfoiodid, polyvinylidene difluoride, etc.). Further, it will be appreciated that the IR camera can be any known or yet to be discovered thermographic camera.

Returning to FIG. 8 computing unit 803 can be directly or indirectly connected to one or more network interfaces 815 for communicating with a network. This type of network interface 815, also sometimes referred to as a network adapter or network interface card (NIC), translates data and control signals from computing unit 803 into network messages according to one or more communication protocols, such as the Transmission Control Protocol (TCP) the Internet Protocol (IP), and the User Datagram Protocol (UDP). These protocols are ell known in the art, and thus will not be discussed here in more detail. An interface 815 may employ any suitable connection agent for connecting to a network, including, for example, a wireless transceiver, a power line adapter, a modem, or an Ethernet connection.

Terminal device 801 may be connected to or otherwise comprise one or more other peripheral devices. In one example, terminal device 801 may comprise a telephone. The telephone may for example, a wireless "smart phone," such as those featuring the Android or iOS operating systems. As known in the art, this type of telephone communicates through a wireless network using radio frequency transmissions. In addition to simple communication functionality, a "smart phone" may also provide a user with one or more data management functions, such as sending, receiving and viewing electronic messages (e.g., electronic mail messages, SMS text messages, etc.), recording or playing back sound files, recording or playing back image files (e.g., still picture or moving video image files), viewing and editing files with text (e.g., Microsoft Word or Excel files, or Adobe Acrobat files), etc.

Of course, still other peripheral devices may be included with or otherwise connected to a terminal device 801 of the type illustrated in FIG. 8, as is well known in the art. In some cases, a peripheral device may be permanently or send permanently connected to computing unit 803. For example, with many terminal devices, computing unit 803, hard disk drive 817, removable optical disk drive 819 and a display are semi-permanently encased in a single housing.

Still other peripheral devices may be removably connected terminal device 801, however. Terminal device 801 may include, for example, one or more communication ports through which a peripheral device can be connected to computing unit 803 (either directly or indirectly through bus 113). These communication ports may thus include a parallel bus port or a serial bus port, such as a serial bus port using the Universal Serial Bus (USB) standard or the IEEE 1394 High Speed Serial Bus standard (e.g., a Firewire port). Alternately or additionally, terminal device 801 may include a wireless data "port," such as a Bluetooth® interface, a Wi-Fi interface, an infrared data port, or the like.

It will be appreciated that a computing device employed according various examples of the invention may include more components than terminal device 801 illustrated in FIG. 8, fewer components than terminal device 801, or a different combination of components than terminal device 801. Some implementations of the invention, for example, may employ one or more computing devices that are tended to have a very specific functionality, such as a server computer. These computing devices may thus omit unnecessary peripherals, such as the network interface 815, removable optical disk drive 819, printers, scanners, external hard drives, etc. Some implementations of the invention may alternately or additionally employ computing devices that are intended to be capable of a wide variety of functions, such as a desktop or laptop personal computer, tablet and/or smartphone. These computing devices may have a any combination of peripheral devices or additional components as desired.

In many examples, computing devices may comprise mobile electronic devices, such as smart phones, smart glasses, tablet computers, or portable music players, often operating the iOS, Sybian, Windows-based (including Windows Mobile and Windows 8), or Android operating systems.

Figure 9:
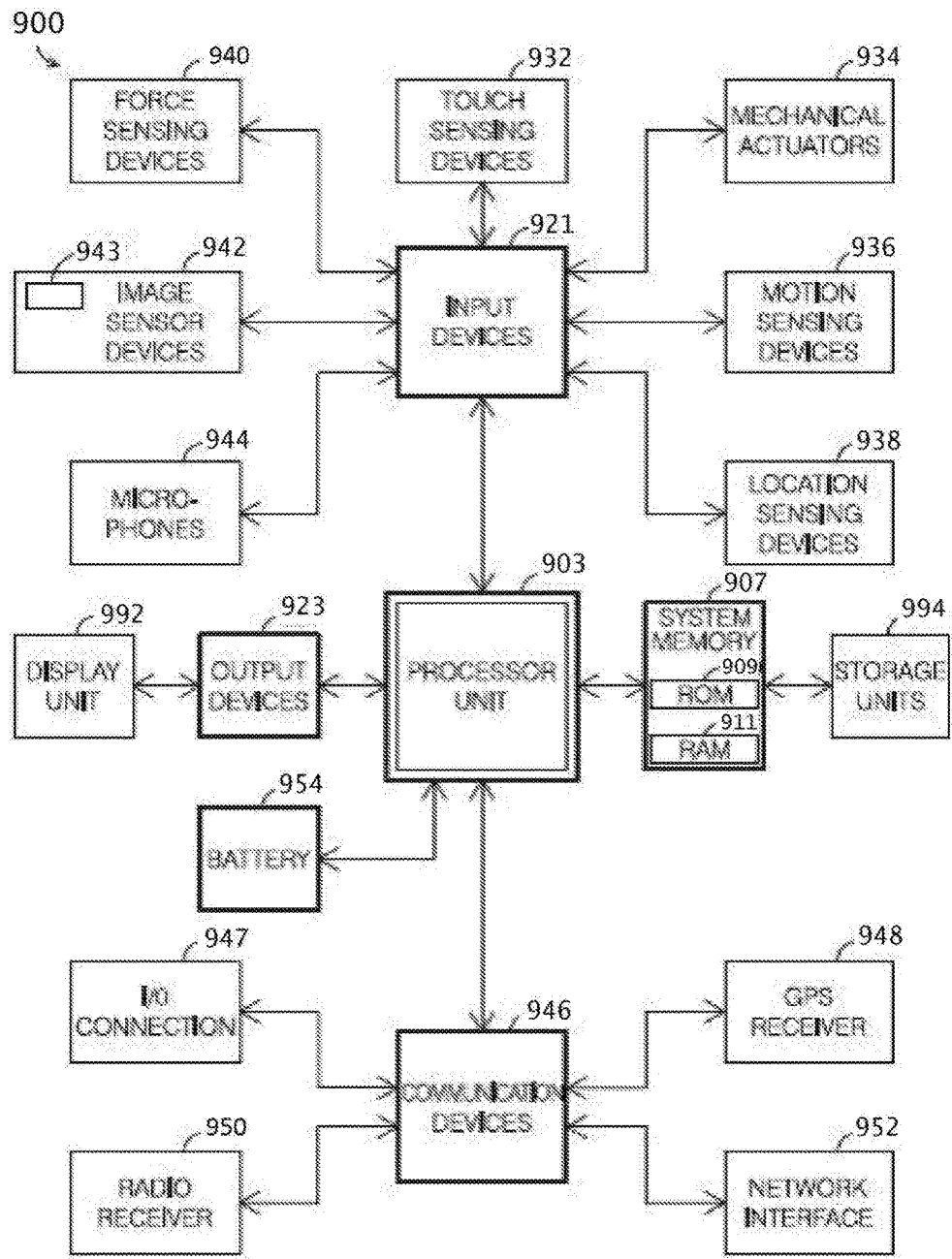
FIG. 9 is a schematic illustration of one example of a mobile terminal device.

With reference to FIG. 9, an exemplary computing device, mobile terminal device 900 is shown. Thus, mobile terminal device 900 may include similar or identical features to terminal device 801. In one example, mobile terminal device 900 may include a processor unit 903 (e.g., CPU) configured to execute instructions and to carry out operations associated with the mobile device. For example, using instructions retrieved from memory, the processor may control the reception and manipulation of input and output data between components of the mobile device. The processor can be implemented on a single chip, multiple or multiple electrical components. For example, various architectures can be used for the processor, including dedicated or embedded processor, single purpose processor, ASIC, etc.

In most cases, the processor together with an operating system operates to execute computer code and produce and use data. The operating system may correspond to well-known operating systems such iOS, Symbian, Windows-based (including Windows Mobile and Windows 8), or Android operating systems, or alternatively to special purpose operating system, such as those used for limited purpose appliance-type devices. The operating system, other computer code and data may reside with in a system memory 907 that is operatively coupled to the processor. System memory 907 generally provides a place to store computer code and data that are used by the mobile device. By way of example, system memory 907 may include read-only memory (ROM) 909, random-access memory (RAM) 911. Further, system memory 907 may retrieve data from storage units 994, which may include a hard disk drive, flash memory, etc. In conjunction with system memory 907, storage units 994 may include a removable storage device such as an optical disc player that receives and plays DVDs, or card slots for receiving mediums such as memory cards (or memory sticks).

Mobile terminal device 900 also includes input devices 921 that are operatively coupled to processor unit 903. Input devices 921 are configured to transfer data from the outside world into mobile terminal device 900. As shown, input devices 921 may correspond to both data entry mechanisms and data capture mechanisms. In particular, input devices 921 may include touch sensing devices 932 such as touch screens, touch pads and touch sensing surfaces, mechanical actuators 934 such as button or wheels or hold switches, motion sensing devices 936 such as accelerometers, location detecting devices 938 such as global positioning satellite transmitters, WiFi based location detection functionality, or cellular radio based location detection functionality, force sensing devices 940 such as force sensitive displays and housings, image sensors 942 such as light cameras and/or IR cameras, and microphones 944. Input devices 921 may also include a clickable display actuator.

More specifically, in the presently described gesture recognition systems, input devices 921 include at least a camera 943 (one of image sensing devices 942). Camera 943 can be a visible light camera and/or a thermographic camera, such as those described above in reference to camera 822. Accordingly, camera 943 may have the same functions and capabilities as those described reference to camera 822.

Returning to FIG. 9, mobile terminal device 900 also includes various output devices 923 that are operatively coupled to processor unit 903. Output devices 923 are configured to transfer data from mobile terminal device 900 to the outside world. Output devices 923 may include a display unit 992 such as an LCD, speakers or jacks, audio/tactile feedback devices, light indicators, and the like.

Mobile terminal device 900 also includes various communication devices 946 that are operatively coupled to the processor. Communication devices 946 may, for example, include both an I/O connection 947 that may be wired or wirelessly connected to selected devices such as through IR, USB, or Firewire protocols, a global positioning satellite receiver 948, and a radio receiver 950 which may configured to communicate over wireless phone and data connections. Communication devices 946 may also include a network interface 952 configured to communicate with a computer network through various means which may include wireless connectivity to a local wireless network, a wireless data connection to a cellular data network, a wired connection to a local or wide area computer network, or other suitable means for transmitting data over a computer network.

Mobile terminal device 900 also includes a battery 954 and possibly a charging system. Battery 954 may be charged through a transformer and power cord or through a host device or through a docking station. In the cases of the docking station, the charging may be transmitted through electrical ports or possibly through in inductance charging means that does not require a physical electrical connection to be made.

The various aspects, features, embodiments or implementations described above can be used alone or in various combinations with the gesture recognition methods disclosed herein. The methods disclosed herein can be implemented by software, hardware or a combination of hardware and software. The methods can also be embodied as computer readable code on a computer readable medium (e.g. a non-transitory computer readable-storage medium). The computer readable medium is airy data storage device that can store data which can thereafter be read by a computer system, including both transfer and non-transfer devices as defined above. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

It can thus be seen that the present invention provides a novel paradigm to optimize a data network as a whole taking the Quality of Experience of the users into account as a constraint. The common intelligence based on the deployment of a traffic steering controller which decides the best access network for each flow of each terminal assisted by user profiling is the key of the great flexibility of the invention and the support of multiple use cases.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring or excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A system for optimizing the performance of a plurality of access networks, the system comprising:
   a first terminal device in electronic communication with the plurality of access networks;
   a traffic steering controller in electronic communication with the first terminal device and configured to receive user profiles, terminal metrics and network performance metrics and create traffic steering rules based on the user profiles, terminal metrics, and network performance; and
   a terminal traffic steering agent associated with the first terminal device and configured to receive traffic steering rules from the traffic steering controller and direct a virtual network switch based on the traffic steering rules,
   wherein the virtual network switch is configured to handle network traffic at a virtual network interface and, based on directions received from the traffic steering controller, exchange network traffic at least at a physical interface of at least one of the plurality of access networks.

2. The system of claim 1, wherein the traffic steering controller is configured to receive network topology information and create the traffic steering rules based at least in part on the network topology information; wherein the network topology information includes information regarding the characteristics and location of access points.

3. The system of claim 1, wherein the traffic steering controller comprises a topology manager configured to collect, store and process network topology information.

4. The system of claim 1, wherein at least some of the access networks utilize different communication technologies.

5. The system of claim 1, wherein the traffic steering controller is configured to receive information regarding the location of the first terminal device and create the traffic steering rules based at least in part on that information.

6. The system of claim 1, wherein the traffic steering controller comprises: a terminal metrics manager configured to monitor, store and process terminal metrics; wherein the terminal metrics include information regarding the location of the first terminal device.

7. The system of claim 1, wherein the traffic steering controller is configured to receive information regarding the characteristics of the first terminal device and create the traffic steering rules based at least in part on that information.

8. The system of claim 1, wherein the traffic steering controller comprises: a terminal metrics manager configured to monitor, store and process terminal metrics; wherein the terminal metrics include information regarding the characteristics of the first terminal device.

9. The system of claim 1, wherein the traffic steering controller creates traffic steering rules based on the metrics captured by the first terminal device within a bounded time frame.

10. The system of claim 1, wherein the traffic steering controller is configured to receive information regarding the positions and characteristics of access points discovered by the first terminal device, and create the traffic steering rules based at least in part on that information.

11. The system of claim 1, wherein the traffic steering controller comprises: a terminal metrics manager configured to monitor, store and process the terminal metrics; wherein the terminal metrics include information regarding the positions and characteristics of access points discovered by the first terminal device.

12. The system of claim 1, wherein the traffic steering controller is configured to notify to the first terminal device of access networks available in nearby.

13. The system of claim 1, wherein the traffic steering controller comprises a user profile manager configured to store, update and generate the user profiles.

14. The system of claim 13, wherein the user profile manager comprises a user classifier configured to classify a user into one of a set of categories of users.

15. The system of claim 13, wherein the user profile manager comprises a traffic predictor configured to predict network traffic generated by users.

16. The system of claim 1, wherein the traffic steering controller is configured to receive network performance information and create the traffic steering rules based at least in part on that information.

17. The system of claim 1, wherein the traffic steering controller comprises a network metrics manager configured to monitor, store and process the network performance information.

18. The system of claim 1, wherein the traffic steering controller is configured to receive information gathered by the first terminal device that is relevant to network performance optimization and create the traffic steering rules based at least in part on that information.

19. The system of claim 1, wherein the traffic steering controller comprises a terminal metrics manager configured to monitor, store and process information gathered by the first terminal device that is relevant to network performance optimization.

20. The system of claim 1 comprising at least a second terminal device in electronic communication with the plurality of access networks, wherein the second terminal device includes a second traffic steering agent.

* * * * *